B. O. WOODS, dec'd.

SOPHRONIA P. WOODS, Adm'x.

Type-Cases.

No. 6,001.

Reissued Aug. 4, 1874.

Witnesses:
Elijah Browne Hazzer.
Albert Henry Hill

Inventor:
Sophronia P. Woods
Administratrix of the Estate
of Benjamin O. Woods
by George P. Appleton
Attorney

THE GRAPHIC CO. PHOTO-LITH. 39 & 41 PARK PLACE, N.Y.

UNITED STATES PATENT OFFICE.

SOPHRONIA P. WOODS, OF BOSTON, MASSACHUSETTS, ADMINISTRATRIX OF BENJAMIN O. WOODS, DECEASED.

IMPROVEMENT IN TYPE-CASES.

Specification forming part of Letters Patent No. 88,762, dated April 6, 1869; reissue No. 6,001, dated August 4, 1874; application filed July 27, 1874.

*To all whom it may concern:*

Be it known that BENJAMIN O. WOODS, of the city of Boston, county of Suffolk and State of Massachusetts, did invent certain new and useful Improvements in Type-Cases, of which the following specification, taken in connection with the accompanying drawings, is a full, clear, and exact description.

The type-cases heretofore in use have been constructed with partitions of narrow interlocked strips, which were attached to the case bottom by screws, nails, or otherwise.

This construction comprehends many valuable features, as, for instance, lightness, strength, and durability of case, adapting it more particularly for use in connection with presses of considerable size, or in offices of some permanency; but their cost when constructed in this manner has been found so great as to preclude their general adoption in connection with the style of presses known as "portable," "amateur," "office" presses, &c.

The principal object of the invention is to remove this disadvantage by producing, in the novel mode of construction to be hereinafter specified, an article which shall possess all the requisites of a good and durable case, and the further desirable quality of cheapness; and to this end it consists in constructing the same from material of thickness equal to the combined width of the partitions and the thickness of the bottom, wherein are cut a series of grooves, transversely to which are arranged the partition-strips, forming thereby the sides and ends of the type-pockets.

Figure 1:
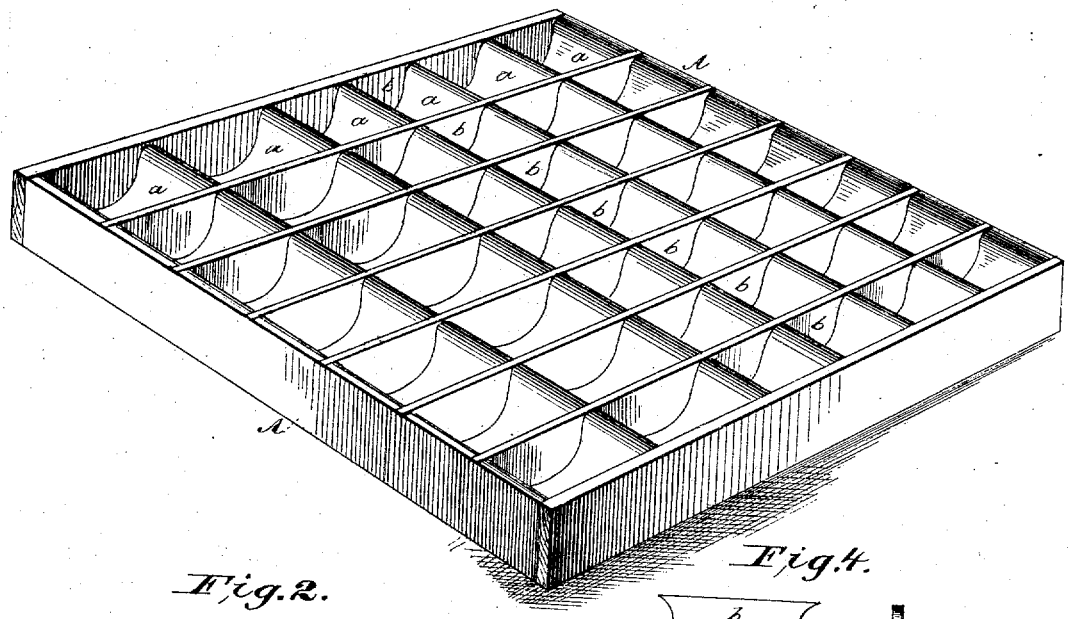
Figure 2:
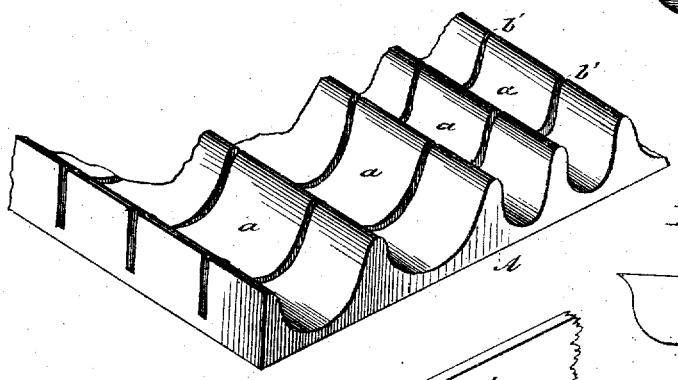
Figure 3:
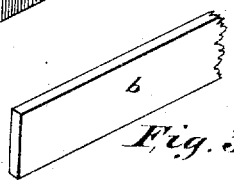

In the drawings, Figure 1 is a perspective view of the improved type-case; Fig. 2, a like view of a portion thereof, omitting the transverse partitions; Fig. 3, a similar view of a portion of one of the transverse partition-strips; and Figs. 4 and 5, views of modifications included in the invention.

Like letters of reference indicate corresponding parts in all the figures.

Figure 4:
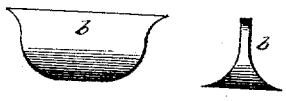
Figure 5:
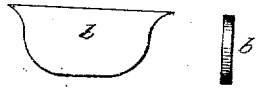

A indicates the main portion of the case, which shall for convenience be styled the body. This is of the requisite thickness to form the bottom of the case and its partitions, in which are cut a number of parallel grooves, *a a*. Transversely to these grooves are arranged and secured the partitions *b b* at suitable distances from each other, which is, preferably, accomplished by cutting grooves *b′ b′*, as seen in Fig. 2, and inserting therein the said strips, (shown in Fig. 3;) but it is obvious that these transverse partitions may be cut to correspond with the contour of the main grooves in the body, as seen in Figs. 4 and 5, and secured in position by glue or otherwise, in which event the cuts or grooves *b′ b′* may be dispensed with.

The partitions if fitted in separately may also be so constructed as to give a curved form to the type-pockets in the direction transverse to the grooves *a a*. (See Fig. 4.) This, however, is not deemed essential, as the rounded form in the direction of the grooves *a a* is sufficient to make the type easily accessible.

Any suitable number and arrangement of these type-cases, and of the pockets, may be made as is done with ordinary-constructed type-cases; and, therefore, no limit is made to any number or arrangement, the essence of the invention consisting in the use of a grooved body with transverse partitions.

Having therefore described the invention, what is claimd as new, and desired to be secured by Letters Patent, is—

1. A type-case comprising a grooved body combined with transverse partitions, whereby the grooves in the body are divided into a series of type pockets or compartments, substantially as described.

2. In a type-case, constructed substantially as described, the combination, with the body A, provided with the curved bottom grooves *a a*, of the transverse partitions *b b*, as and for the purpose specified.

SOPHRONIA P. WOODS,
*Administratrix of the Estate of Benjamin O. Woods, deceased.*

Witnesses:
WALTER HOBART,
ANSON S. COMEE.